US011556696B2

(12) United States Patent
Chopdekar et al.

(10) Patent No.: US 11,556,696 B2
(45) Date of Patent: Jan. 17, 2023

(54) SYSTEMS AND METHODS FOR PROCESSING AND DISPLAYING MESSAGES IN DIGITAL COMMUNICATIONS

(71) Applicant: Avaya Management L.P., Durham, NC (US)

(72) Inventors: Sandesh Chopdekar, Pune (IN); Pushkar Deole, Pune (IN); Navin Daga, Silapathar (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/201,852

(22) Filed: Mar. 15, 2021

(65) Prior Publication Data

US 2022/0292254 A1    Sep. 15, 2022

(51) Int. Cl.
| | |
|---|---|
| G10L 15/22 | (2006.01) |
| G06F 40/166 | (2020.01) |
| G06F 3/14 | (2006.01) |
| H04L 51/04 | (2022.01) |
| G06F 40/106 | (2020.01) |
| G06F 40/253 | (2020.01) |

(52) U.S. Cl.
CPC .............. *G06F 40/166* (2020.01); *G06F 3/14* (2013.01); *G06F 40/106* (2020.01); *G06F 40/253* (2020.01); *H04L 51/04* (2013.01)

(58) Field of Classification Search
CPC .... G06F 40/166; G06F 40/253; G06F 40/106; G06F 3/14; H04L 51/04
See application file for complete search history.

(56) References Cited

U.S. PATENT DOCUMENTS

| | | | | |
|---|---|---|---|---|
| 7,286,987 | B2* | 10/2007 | Roy | G10L 15/08 |
| | | | | 704/270 |
| 7,552,183 | B2* | 6/2009 | Coletrane | H04L 29/12783 |
| | | | | 455/466 |
| 8,442,563 | B2* | 5/2013 | Chen | H04L 67/02 |
| | | | | 455/466 |
| 9,143,358 | B2* | 9/2015 | An | G06Q 10/10 |
| 9,349,118 | B2* | 5/2016 | Chavez | G06Q 10/103 |
| 9,390,087 | B1* | 7/2016 | Roux | G06F 16/3329 |
| 9,398,152 | B2* | 7/2016 | Christensen | H04M 3/5191 |
| 9,916,295 | B1* | 3/2018 | Crawford | G06F 40/166 |
| 10,200,536 | B2* | 2/2019 | Klein | H04L 67/14 |
| 10,218,848 | B2* | 2/2019 | Deryugin | H04M 3/523 |
| 10,284,812 | B1* | 5/2019 | Van Os | H04N 5/2628 |
| 10,447,853 | B1* | 10/2019 | Ouimette | H04M 3/5133 |
| 10,573,312 | B1* | 2/2020 | Thomson | G10L 15/187 |
| 10,623,345 | B2* | 4/2020 | Wu | H04L 12/1822 |
| 10,971,153 | B2* | 4/2021 | Thomson | G10L 15/22 |
| 11,134,104 | B2* | 9/2021 | Qureshi | G06F 21/14 |

(Continued)

FOREIGN PATENT DOCUMENTS

JP    2018-147102    9/2018

*Primary Examiner* — Hassan Mrabi
(74) *Attorney, Agent, or Firm* — Sheridan Ross P.C.

(57) ABSTRACT

Systems and methods include receiving, with a processor, two or more messages from a first user device participating in a communication session, processing, with the processor, the two or more messages, generating, with the processor, a processed message, and displaying, with the processor, the processed message on a second user device participating in the communication session.

20 Claims, 13 Drawing Sheets

(56) References Cited

U.S. PATENT DOCUMENTS

| | | | |
|---|---|---|---|
| 2002/0184309 A1* | 12/2002 | Danker | G06F 40/237 709/204 |
| 2003/0174830 A1* | 9/2003 | Boyer | H04M 3/51 379/265.02 |
| 2004/0010431 A1* | 1/2004 | Thomas | H04M 3/5158 705/7.13 |
| 2005/0010369 A1* | 1/2005 | Varpela | G16B 50/00 702/19 |
| 2005/0187781 A1* | 8/2005 | Christensen | H04L 51/04 709/207 |
| 2006/0188086 A1* | 8/2006 | Busey | H04M 3/5191 379/265.09 |
| 2006/0265656 A1* | 11/2006 | Lambert | G06Q 10/00 715/705 |
| 2008/0224903 A1* | 9/2008 | Samuels | H03M 7/3084 341/51 |
| 2008/0228933 A1* | 9/2008 | Plamondon | H03M 7/30 709/230 |
| 2009/0132668 A1* | 5/2009 | Coletrane | H04L 29/12783 709/206 |
| 2009/0287920 A1* | 11/2009 | Fernandez | H04L 63/16 713/151 |
| 2010/0151889 A1* | 6/2010 | Chen | H04L 67/02 455/466 |
| 2010/0205539 A1* | 8/2010 | Gestsson | H04L 51/04 715/752 |
| 2010/0246570 A1* | 9/2010 | Chavez | H04L 65/1006 370/352 |
| 2011/0123003 A1* | 5/2011 | Romriell | H04L 12/66 379/52 |
| 2011/0200179 A1* | 8/2011 | Moore | G06Q 20/085 379/88.01 |
| 2011/0252105 A1* | 10/2011 | Lee | H04L 51/04 709/206 |
| 2011/0276513 A1* | 11/2011 | Erhart | G06F 16/2465 705/347 |
| 2012/0317217 A1* | 12/2012 | Lavy | G06F 21/32 709/206 |
| 2014/0006347 A1* | 1/2014 | Qureshi | H04W 4/029 707/621 |
| 2014/0100848 A1* | 4/2014 | Shaffer | G10L 15/22 704/240 |
| 2014/0150108 A1* | 5/2014 | Low | G06F 21/60 726/26 |
| 2014/0156262 A1* | 6/2014 | Yuen | G06F 3/04842 704/9 |
| 2014/0278951 A1* | 9/2014 | O'Connor | G06Q 30/0251 705/14.49 |
| 2014/0282083 A1* | 9/2014 | Gaetano Jr. | H04L 12/1822 715/752 |
| 2014/0301540 A1* | 10/2014 | Skiba | H04L 51/046 379/265.07 |
| 2014/0303960 A1* | 10/2014 | Orsini | H04L 51/04 704/2 |
| 2014/0303981 A1* | 10/2014 | Skiba | H04L 51/046 704/270 |
| 2015/0006143 A1* | 1/2015 | Skiba | G06F 40/30 704/2 |
| 2015/0319307 A1* | 11/2015 | Govindarajan | H04M 3/523 379/265.02 |
| 2016/0149839 A1* | 5/2016 | Yi | H04L 67/1095 709/206 |
| 2016/0277329 A1* | 9/2016 | Gordon | H04L 51/046 |
| 2017/0213138 A1* | 7/2017 | Bojja | G06N 20/20 |
| 2017/0237692 A1* | 8/2017 | Sheth | H04W 4/06 715/758 |
| 2018/0039608 A1* | 2/2018 | Sharifi | G06F 40/232 |
| 2018/0137295 A1* | 5/2018 | Sharma | G06F 21/606 |
| 2018/0302457 A1* | 10/2018 | Hassan | H04L 65/80 |
| 2018/0316741 A1* | 11/2018 | Hassan | H04L 65/602 |
| 2018/0349206 A1* | 12/2018 | Erickson | G06F 40/263 |
| 2018/0359198 A1* | 12/2018 | Eidem | H04L 67/306 |
| 2019/0057143 A1* | 2/2019 | Porter | G06Q 10/10 |
| 2019/0095422 A1* | 3/2019 | Chiang | G06F 40/114 |
| 2019/0146477 A1* | 5/2019 | Cella | G01M 13/045 702/188 |
| 2019/0158437 A1* | 5/2019 | Gong | H04L 47/11 |
| 2019/0205463 A1* | 7/2019 | Santhanam | G06F 16/353 |
| 2019/0272322 A1* | 9/2019 | De Ridder | G06F 16/9538 |
| 2020/0014642 A1* | 1/2020 | Sidi | H04L 51/046 |
| 2020/0036803 A1* | 1/2020 | Galchenko | H04L 67/22 |
| 2020/0092231 A1* | 3/2020 | Yu | H04L 67/12 |
| 2020/0169543 A1* | 5/2020 | Vaughn | G06F 40/30 |
| 2020/0175987 A1* | 6/2020 | Thomson | G10L 15/22 |
| 2020/0228392 A1* | 7/2020 | Kushmerick | H04L 67/38 |
| 2020/0394361 A1* | 12/2020 | Parikh | G06F 40/274 |
| 2021/0056167 A1* | 2/2021 | Lam | G06F 40/30 |
| 2021/0110266 A1* | 4/2021 | Wang | G06N 3/082 |
| 2021/0118579 A1* | 4/2021 | Morris | G06F 21/32 |

\* cited by examiner

```
Communication Session ID:  Technical
Support
[Admin | 20210205_11:03:04 | "Hello,
how can I help?"]
[User | 20210205_11:04:20 | "I had
bought a tv set"]
[User | 20210205_11:04:25 | "However
some problems"]
[User | 20210205_11:04:40 | "With
power"]
[User | 20210205_11:04:55 | "Not able
to turn on tv"]
[User | 20210205_11:05:30 | "Tried
several"]
[User | 20210205_11:05:31 | "Things"]
[User | 20210205_11:05:45 | "Checked
power"]
[User | 20210205_11:05:50 | "Socket."]
[User | 20210205_11:06:01 | "No
issues"]
[User | 20210205_11:06:03 | "With
power socket/plug"]
[User | 20210205_11:06:15 | "Other
devices are working"]
```

SYSTEMS AND METHODS FOR PROCESSING AND DISPLAYING MESSAGES IN DIGITAL COMMUNICATIONS

FIELD

The disclosure relates generally to messaging applications and particularly to presenting message data in a real-time chat session in a user-friendly manner.

BACKGROUND

As electronic user devices such as smart phones, tablets, computers, etc., become more commonplace, more and more communication between people occurs via text communication applications such as WhatsApp, WeChat, Line, iMessage, etc., as well as browser-based text communication such as WebChat.

Text communication over the Internet has enabled real-time spread of information. With conventional communication applications, each message in a communication session is presented in the form the user entered the message before clicking a send button in real-time.

While the instantaneous delivery of messages enables real-time communication, messages are often sent with minimal or no editing and many times without forming complete thoughts. A single communication session often includes a number of messages with little to no significance.

For example, a user may interact with a representative business via a browser-based communication session. The user may seek help dealing with an issue relating to the business and the representative may seek information from the user to resolve the issue. A user in such a scenario will often send a plurality of text messages including incomplete thoughts through the communication session. These messages result in an inefficient use of time for the representative as the representative waits for a complete thought to be formed. In many cases, business representatives such as agents in a contact center handle multiple chat sessions with multiple customers at the same time. In such a scenario, an incomplete message sent from one customer, if presented to an agent in its original format, may divert the agent's attention from chat sessions with other customers reducing the productivity of the agent. Also, messages sent from users will often include many typographical issues and unusual formatting choices, resulting in the representative being confronted with difficult to understand messages.

What is needed is a communication system capable of resolving the above described issues with conventional communication systems.

DETAILED DESCRIPTION

Figure 1:
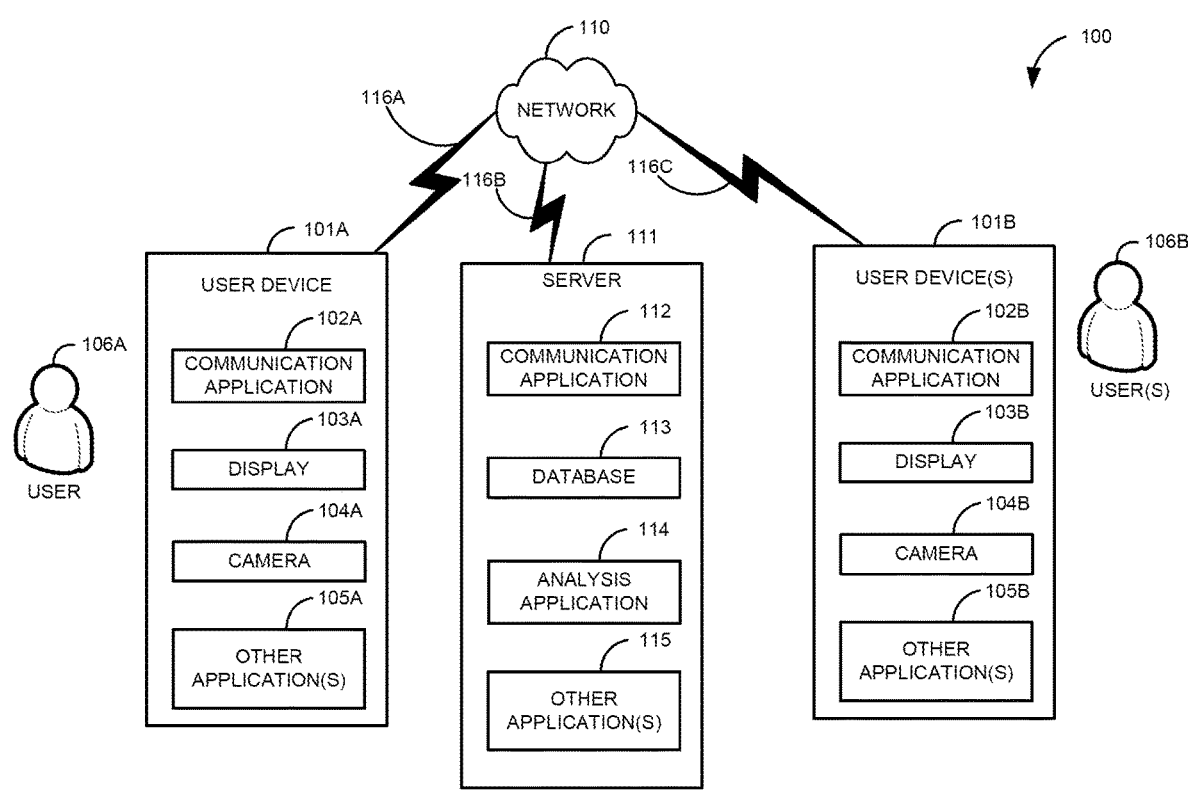
FIG. 1 is a block diagram of a first illustrative system for implementing a communication session in accordance with one or more embodiments of the present disclosure.

The above discussed issues with contemporary communication applications and other needs are addressed by the various embodiments and configurations of the present disclosure. As described herein, messages in a communication session may be processed so as to consolidate related messages, incomplete messages, and/or partially incomplete messages together together to provide users with a user interface showing coherent and complete thoughts in a typographical error-free manner. Such a system as described herein provides a rich experience to each user of the communication session.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Any combination of one or more computer readable mediums may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

FIG. 1 is a block diagram of a first illustrative system 100 for a communication session between one or more users in accordance with one or more of the embodiments described herein. The first illustrative system 100 comprises user communication devices 101A, 101B and a network 110. In addition, users 106A-106B are also shown.

The user communication devices 101A, 101B can be or may include any user device that can communicate on the network 110, such as a Personal Computer ("PC"), a video phone, a video conferencing system, a cellular telephone, a Personal Digital Assistant ("PDA"), a tablet device, a notebook device, a smartphone, and/or the like. The user communication devices 101A, 101B are devices used as endpoints for a communication session. Although only two user communication devices 101A, 101B are shown for convenience in FIG. 1, any number of user communication devices 101 may be connected to the network 110 for establishing a communication session.

The user communication devices 101A, 101B further comprise communication applications 102A, 102B, displays 103A, 103B, and cameras 104A, 104B. It should be appreciated that, in some embodiments, user devices may lack cameras 104A, 104B. Also, while not shown for convenience, the user communication devices 101A, 101B typically comprise other elements, such as a microprocessor, a microphone, a browser, other applications, and/or the like.

In addition, the user communication devices 101A, 101B may also comprise other application(s) 105A, 105B. The other application(s) 105A can be any application, such as, a slide presentation application, a document editor application, a document display application, a graphical editing application, a calculator, an email application, a spreadsheet, a multimedia application, a gaming application, and/or the like. The communication applications 102A, 102B can be or may include any hardware/software that can manage a communication session that is displayed to the users 106A, 106B. For example, the communication applications 102A, 102B can be used to establish and display a communication session.

The displays 103A, 103B can be or may include any hardware display or projection system that can display an image of a video conference, such as a LED display, a plasma display, a projector, a liquid crystal display, a cathode ray tube, and/or the like. The displays 103A-103B can be used to display user interfaces as part of communication applications 102A-102B.

The user communication devices 101A, 101B may also comprise one or more other applications 105A, 105B. The other applications 105A, 105B may work with the communication applications 102A, 102B.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), H.323, video protocol, video protocols, Integrated Services Digital Network (ISDN), and the like. Thus, the network 110 is an electronic communication network configured to carry messages via packets and/or circuit switched communications.

The network may be used by the user devices 101A, 101B, and a server 111 to carry out communication. During a communication session, data 116A may be sent and/or received via user device 101A, data 116B may be sent and/or received via server 111, and data 116C may be sent and/or received via user device 101B.

The server 111 may comprise any type of computer device that can communicate on the network 110, such as a server, a Personal Computer ("PC"), a video phone, a video conferencing system, a cellular telephone, a Personal Digital Assistant ("PDA"), a tablet device, a notebook device, a smartphone, and/or the like. Although only one server 111 is shown for convenience in FIG. 1, any number of servers 111 may be connected to the network 110 for establishing a communication session. In some embodiments, the server may be a contact center server, user devices may be one or more of a communication device of a customer and a communication device of a contact center agent hosting an agent desktop application.

The server 111 may further comprise a communication application 112, database(s) 113, analysis applications 114, other application(s) 115, and, while not shown for convenience, other elements such as a microprocessor, a microphone, a browser application, and/or the like. In some embodiments, analysis applications 114 may comprise a text analysis engine. The text analysis engine may be configured to execute one or more components based on machine learning and/or natural language processing. In some embodiments, machine learning and/or natural language processing algorithms may be executed by the server itself to carry out the work of processing messages, while in other embodiments, the server may access one or more third party services provided by cloud service providers for machine learning and/or natural language processing for processing text messages. In some embodiments, a combination of server-executed artificial intelligence systems and third part based systems may be used.

Figure 2A:
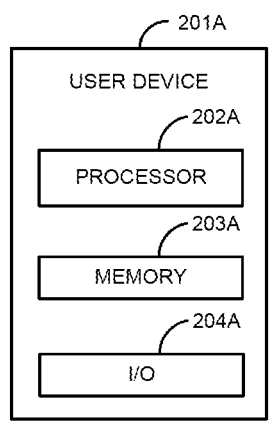
FIG. 2A is a block diagram of a user device system for executing a communication session in accordance with one or more embodiments of the present disclosure.
Figure 2B:
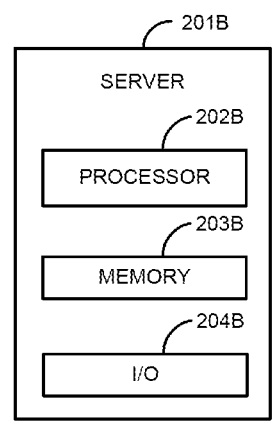
FIG. 2B is a block diagram of a server for executing a communication session in accordance with one or more embodiments of the present disclosure.

FIGS. 2A and 2B illustrate components of an exemplary user device 201A and server 201B for use in certain embodiments as described herein. In some embodiments, a user device 201A may comprise a processor 202A, memory 203A, and input/output devices 204A. Similarly, a server 201B may comprise a processor 202B, memory 203B, and input/output devices 204B.

A processor 202A, 202B may comprise a processor or microprocessor. As used herein, the word processor may refer to a plurality of processors and/or microprocessors operating together. Processors 202A, 202B may be capable of executing software and performing steps of methods as described herein. For example, a processor 202A, 202B may be configured to display user interfaces on a display of a computer device. Memory 203A, 203B of a user device 201A, 201B may comprise memory, data storage, or other non-transitory storage device configured with instructions for the operation of the processor 202A, 202B to perform steps described herein. Accordingly, processes may be embodied as machine-readable and machine-executable code for execution by a processor to perform the steps herein and, optionally, other processing tasks. Input/output devices 204A, 204B may comprise, but should not be considered as limited to, keyboards, mice, microphones, cameras, display devices, network cards, etc.

Figure 3A:
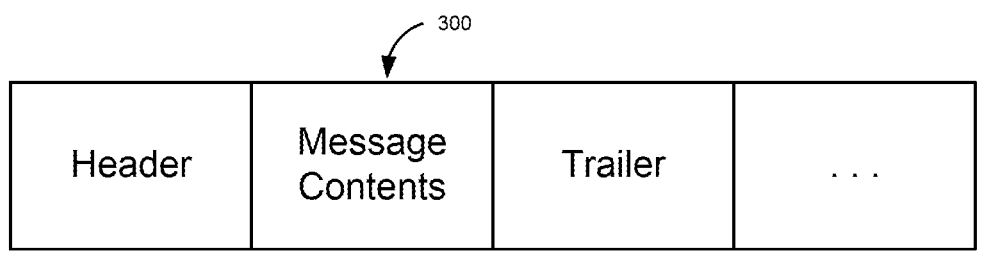
FIG. 3A is a block diagram of a data packet in accordance with one or more embodiments of the present disclosure.

As illustrated in FIG. 3A, a message may be sent between devices in the form of a data packet 300. A data packet 300 may comprise one or more data blocks such as a header, message contents, a trailer, or other type of information. A header of a data packet 300 for a message may comprise information such as an identity of a sender of the message, an identity of a recipient or recipients of the message, a timestamp indicating a date and/or time the message was sent, or other types of information. Message contents of a data packet 300 may comprise text or image data which is to be sent in the form of message to one or more other units or devices. A trailer of a data packet 300 may comprise information similar to the header of the data packet 300 or other type types of data and or metadata for the message which must be included in the data packet 300.

Figure 3B:
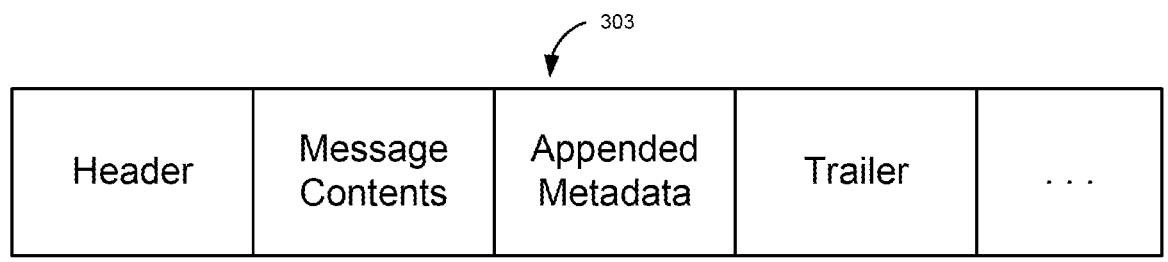
FIG. 3B is a block diagram of a data packet in accordance with one or more embodiments of the present disclosure.

As illustrated in FIG. 3B, a data packet 303 may be appended with metadata or other types of data in addition to the basic contents of a message data packet 300 as illustrated in FIG. 3A. For example, when a user of a user device sends a message as part of a communication session, the message may be sent in the form of a data packet 300 to a server via a network connection. The server may receive the data packet 300 and transmit the message to one or more other user devices. In some embodiments, the server may be configured to analyze the message. The server may be configured to, after processing the message contents, append the data packet 300 with additional metadata to create an appended message data packet 303. Additional metadata appended to a data packet 303 may comprise, for example, original text of the message, the processed text of the message or other types of information.

Illustratively, the user communication devices 101A, 101B, the communication applications, the displays, the application(s), are stored-program-controlled entities, such as a computer or microprocessor, which performs the methods and the processes described herein by executing program instructions stored in a computer-readable storage medium, such as a memory (i.e., a computer memory, a hard disk, and/or the like). Although the methods described herein may be shown in a specific order, one of skill in the art would recognize that the steps of systems and methods described herein may be implemented in different orders and/or be implemented in a multi-threaded environment. Moreover, various steps may be omitted or added based on implementation.

Figure 4A:
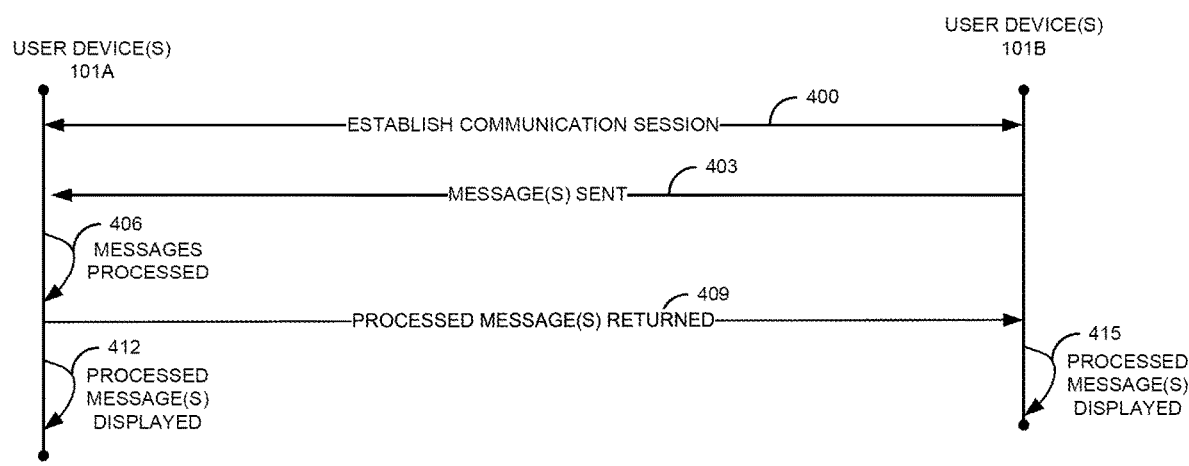
FIG. 4A is a flow diagram of an interchange of data in accordance with one or more embodiments of the present disclosure.

FIG. 4A is a flow diagram of a process using a communication application to exchange messages between two or more user devices 101A, 101B of users participating in a communication session in accordance with one or more of the embodiments described herein. The process starts when a communication session is established at 500. A communication session may be established for example when one user of a user device uses a messaging app or other type of communication application to send a message, such as a text message, to one or more other users of user devices. When the communication session is established, messages may be sent between user devices 101A, 101B participating in the communication session and/or a server 111.

Once a communication session is established, user devices may be free to send messages to other user devices participating in the communication session. For example, user device 101B may send a message via the communication application at 502. Messages sent from user device 101B may be sent to the server 111 prior to being distributed to other user devices. In some embodiments, messages may be delivered without analysis by a server 111 at 403. In such embodiments, processing or analysis of sent messages may be performed by receiving user device 101A, or other user devices, at 406. Performing analysis may comprise the user device 101A analyzing a text string within a received message. The analysis performed by user device 101A may be performed automatically. For example, a neural networks such as a convolutional neural network or other type of artificial intelligence system may be used. In some embodiments, analysis performed by a user device may comprise utilizing a communication application on the user device to leverage third party artificial intelligence service providers hosted in a public cloud such as Google AI or a similar provider.

Processing a message or messages may comprise, as described herein, combining messages into one or more sentences, concatenating messages using joining characters such as commas, semicolons, periods, or other conjunctions, or using an AI or machine learning engine to interpret the message or messages and output a revised version as described herein.

At 409, processed messages may be returned to the sending user device 101B. In the example embodiment of FIG. 4, the processed messages may be displayed at each user device participating in the communication session. It should be appreciated that in some embodiments, processed messages may not be displayed on one or more of the user devices. For example, in some embodiments, a processed message created from one or more original messages may be hidden from the user device having sent the original messages. In such an embodiment, the processed messages may not be returned to the sending user device. At 412, the processed message or messages may be displayed in a user interface of the user device 101A and at 415, the processed message or messages may be displayed in a user interface of the user device 101B.

Figure 4B:
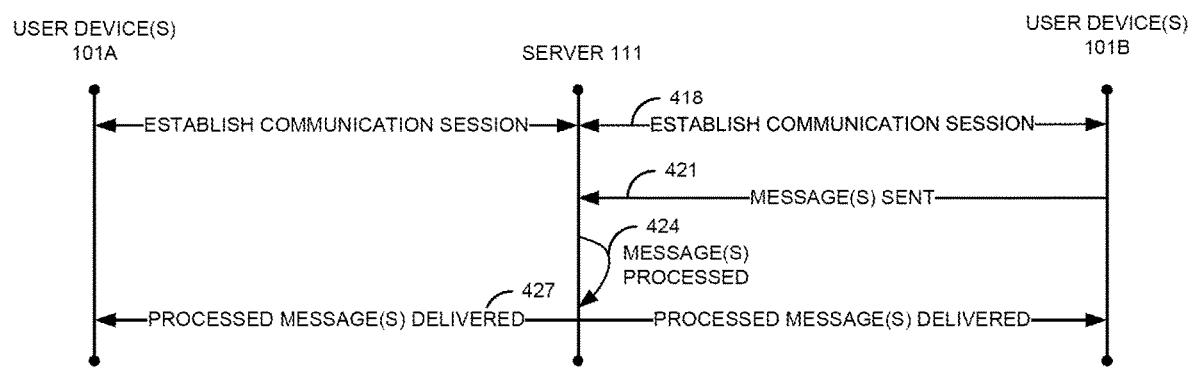
FIG. 4B is a flow diagram of an interchange of data in accordance with one or more embodiments of the present disclosure.

As illustrated in FIG. 4B, the analysis or processing of messages may be performed by a server 111. As discussed above, a communication session may be established at 418. One or more messages may be sent from a user device 101B at 421 and may be received by the server 111. When the server 111 receives a new message or messages at 421, the server 111 may perform analysis at 424 prior to delivering the message to other user devices 101A participating in the communication session. After the server 111 performs the analysis or processing, the server 111 may append the message or messages with metadata or may generate a new processed message. The processed message may be delivered to each user device 101A, 101B participating in the communication session at 427.

Figures 5A, 5B:
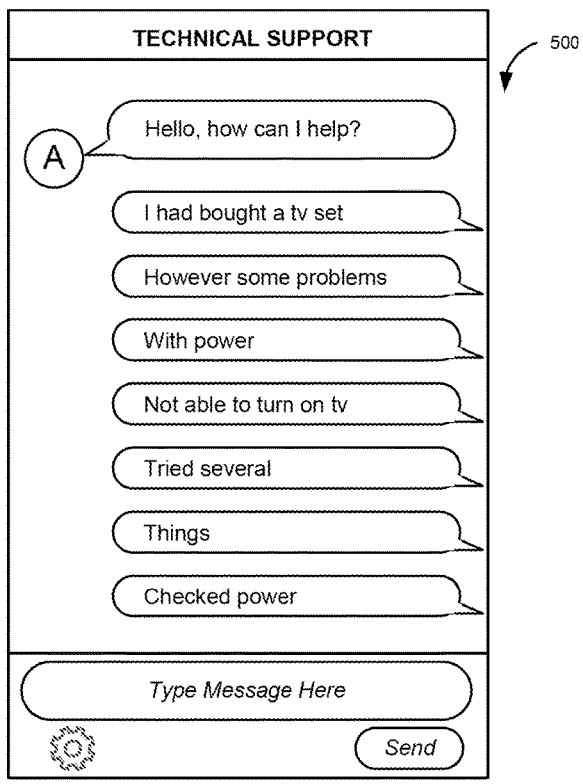
FIG. 5A is an illustration of a user interface in accordance with one or more embodiments of the present disclosure.
FIG. 5B is an illustration of a data file in accordance with one or more embodiments of the present disclosure.

As messages are received by a user device participating in a communication session, the messages may be displayed in the order received in the user interface 500 as illustrated in FIG. 5A. In the example illustrated in FIG. 5A, a user of a first user device is communicating with an administrator of a technical support website. It should be appreciated that while the user interface 500 resembles a user interface of a smartphone, the same or similar principles apply to browser-based communication sessions.

Messages sent from the first user of the first user device may be displayed in line with messages received from other users participating in the communication session. For example, messages from a technical support analyst and messages from a user contacting the technical support analyst may be displayed along with an indication of which user sent which message.

In some embodiments, if multiple customer chat sessions are assigned to one support analyst then each session may be displayed in a list, one below other, in a UI. Using the UI, the analyst can traverse between multiple chat sessions. Each chat session may provide some indication or alert when new message arrives in that session from respective customer. In some embodiments, the alert or indication may be used to divert an agent's attention from one chat session to another. As such, the alert or indication may be provided only when a message is processed. In this way, only messages with sufficient meaning or completeness for agent to work on it may prompt an alert or indication.

The user interface 500 may include an identification of the communication session, for example a title of the communication session may be displayed at the top of the user interface 500. The user interface 500 may also include a text box enabling a user of a user device displaying the user interface 500 to input a message to be sent to the communication session. The user interface 500 may also include a graphical user interface button configured to configure settings for the user interface 500 or the communication session in general.

FIG. 5B is an illustration of a data file 503 which may be generated as users participating in a communication session send messages. The data file 503 may comprise a communication session identifier, such as a title of the communication session, a listing of users participating in the communication session, or other information.

Each message sent in the communication session may be stored as text in the data file 503 along with information such as a timestamp indicating a date and/or time the message was sent, an identifier of the user having sent the message, and a text string including the text of the message.

Figure 5C:
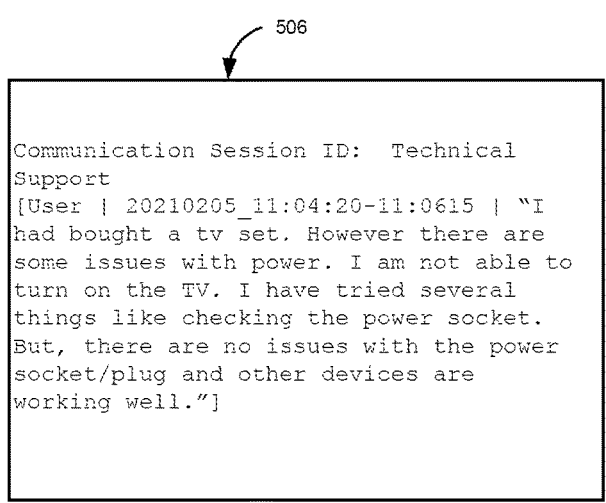
FIG. 5C is an illustration of a user interface in accordance with one or more embodiments of the present disclosure.

FIG. 5C is an illustration of a data file 506 including a processed message. As should be appreciated, the messages of the data file 503 in FIG. 5B were processed to generate the processed message of the data file 506. The processed message may include information such as an identifier of the user having sent the message, a timestamp including a range of times which the messages used to generate the processed message were sent, and a text of the processed message as generated by a computing system.

Figure 5D:
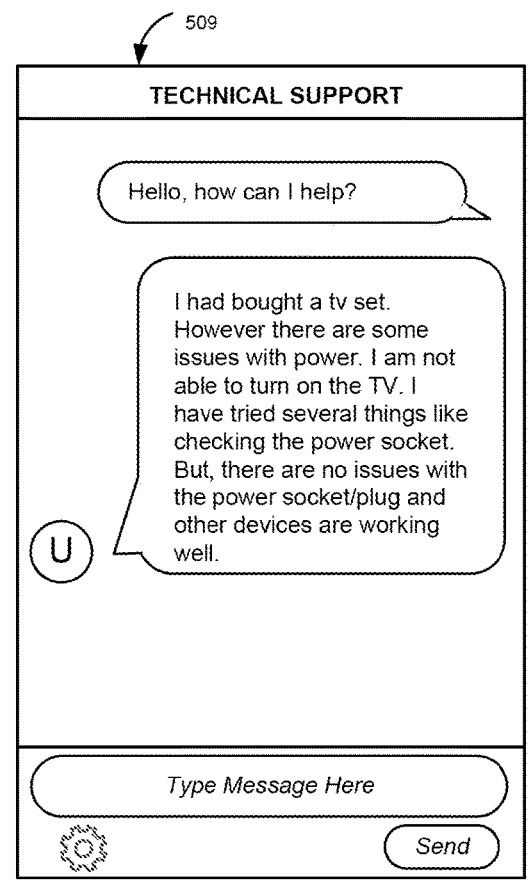
FIG. 5D is an illustration of a data file in accordance with one or more embodiments of the present disclosure.

FIG. 5D is an illustration of a user interface 509 which may be displayed on a user device during a communication session. As described above, as messages are received by a user device participating in a communication session, the messages may be displayed in the order received in the user interface 500 as illustrated in FIG. 5A. In the example illustrated in FIG. 5A, a user of a first user device is communicating with an administrator of a technical support website. It should be appreciated that while the user interface 500 resembles a user interface of a smartphone, the same or similar principles apply to browser-based communication sessions. As illustrated in FIG. 5D, the processed message generated may be displayed in a user interface 509 displayed on a user device operated by an administrator of a technical support website. It should be appreciated that although the processed message is shown in FIG. 5D on a user display, the same processed message may similarly appear on a device display of an administrator of a technical support website with whom the user is having communication. In some embodiments, the administrator may be alerted and/or otherwise notified of any new messages in the communication session only after the system has processed the incoming messages to form a sentence that is complete, with respect to the completion criteria as described below. In this way, an administrator, or other user, may avoid being distracted until received messages have been processed and are ready to be read.

Figure 5E:
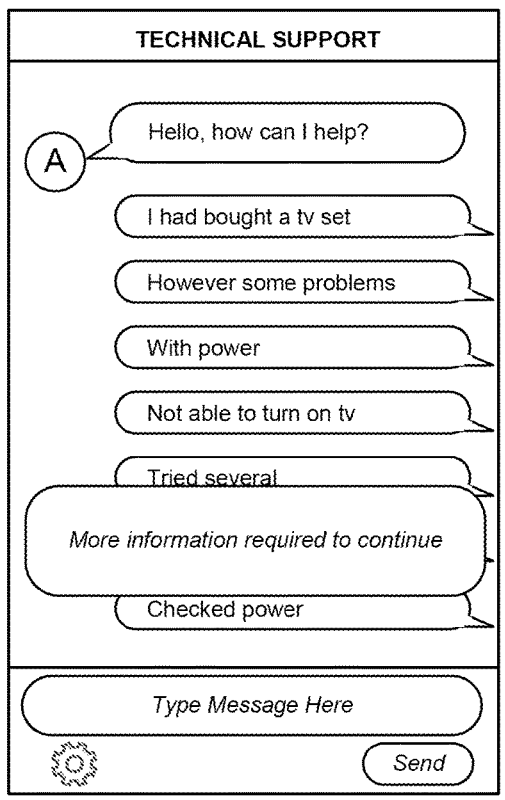
FIG. 5E is an illustration of a user interface in accordance with one or more embodiments of the present disclosure.

As illustrated in FIG. 5E, a user interface 512 may comprise a visual indicator comprising an alert message to notify a user interacting with the user interface as to whether more information is required. For example, a sentence checker subsystem may be configured to process messages sent by the user to determine whether a complete sentence has been formed. If a complete sentence has not been formed by the messages sent by the user after a predetermined amount of time, an alert message such as that illustrated in FIG. 5E may be displayed in the user interface 512.

Figure 5F:
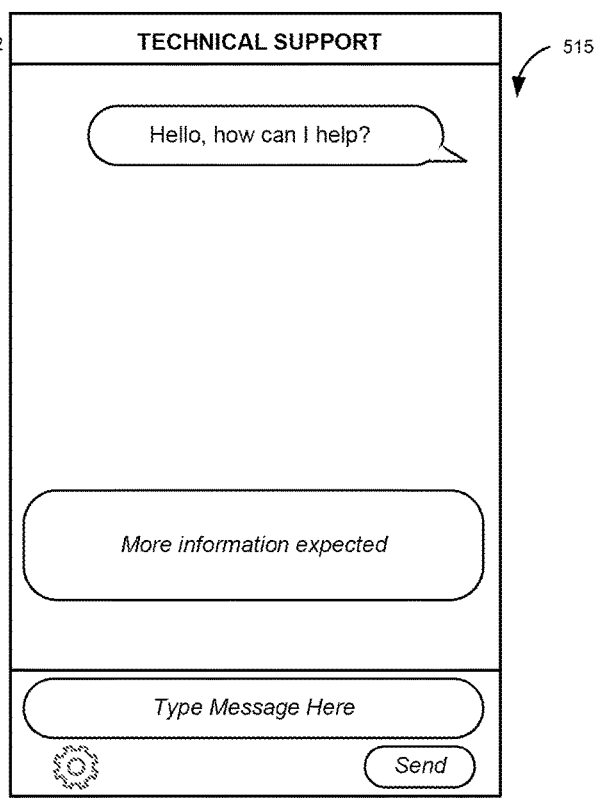
FIG. 5F is an illustration of a user interface in accordance with one or more embodiments of the present disclosure.

Similarly, as illustrated in FIG. 5F, an alert message may be displayed on a user interface 515 of other users participating in the communication session that more information is expected. As should be appreciated by FIGS. 5E and 5F, in some embodiments, messages from another user may not be displayed to other users until the messages have been sent, analyzed, and processed. The user waiting for messages from the other user may be presented with a notification or alert message displayed in the user interface 515 as to whether more information is expected from the other user. Note that while the many messages sent by the first user are not displayed to the other user in the user interface 515, it should be appreciated that such messages could be displayed in the user interface 515 until replaced by a processed message. For example, the user interface may change from that illustrated in FIG. 5A to that illustrated in FIG. 5D upon the processed message being generated. A notification or alert message such as that illustrated in FIG. 5F may be used to notify an administrator that a customer is typing or has typed, and that the system has sent the customer an alert that more information is needed. Using such a system, an advisor or other user may avoid being alerted until processing is complete and a processed message appears on display.

Figure 5G:
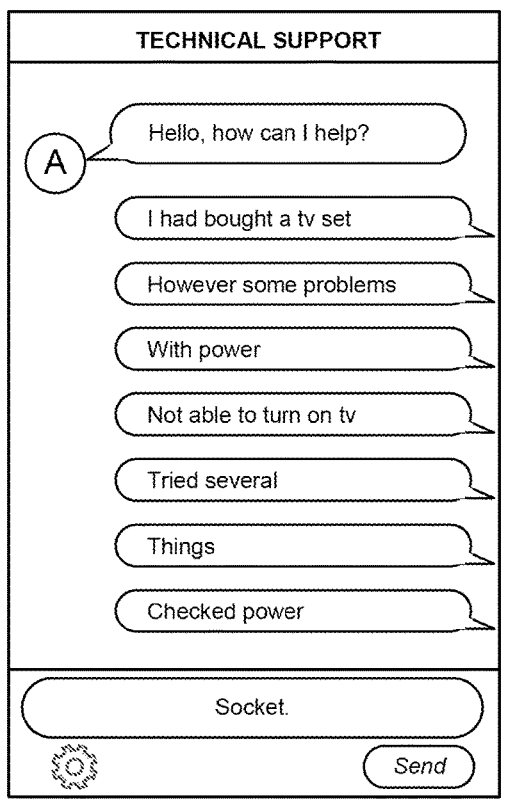
FIG. 5G is an illustration of a user interface in accordance with one or more embodiments of the present disclosure.
Figure 5H:
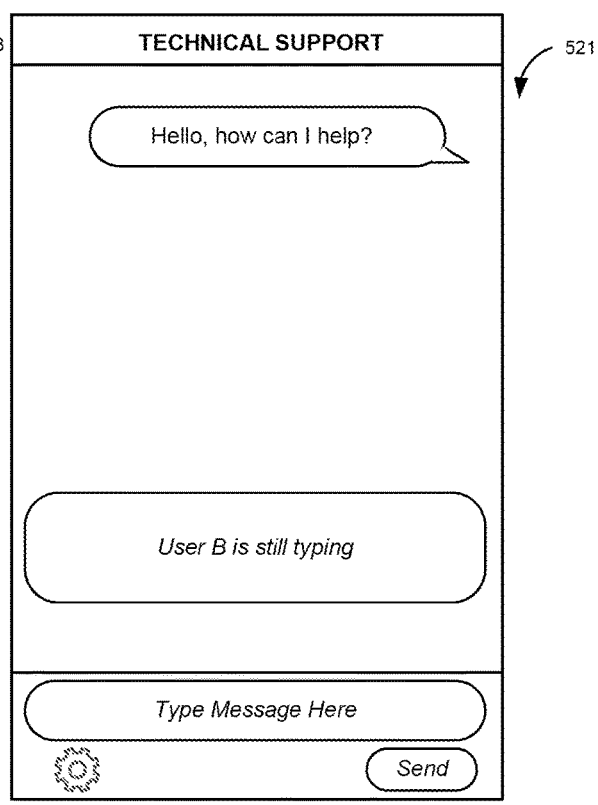
FIG. 5H is an illustration of a user interface in accordance with one or more embodiments of the present disclosure.

As illustrated in FIG. 5G, as a first user types, the text being typed may be displayed in a text box of the user interface 518 of the first user typing. While the first user types, a user interface 521 of a second user participating in the communication session may display an indication that the user is still typing as illustrated in FIG. 5H. Note that in the example illustrated in FIG. 5H, the previous messages of the first user, illustrated in FIG. 5G, are not displayed in the user interface 521 as a sentence has not yet been completed. It should be appreciated, as discussed above, that such messages could be displayed in the user interface 521 until replaced by a processed message.

Messages sent from the first user of the first user device may be displayed in line with messages received from other users participating in the communication session. For example, messages from a technical support analyst and messages from a user contacting the technical support analyst may be displayed along with an indication of which user sent which message. The user interface 509 including a processed message may include an identification of the communication session, for example a title of the communication session may be displayed at the top of the user interface 509. The user interface 509 may also include a text box enabling a user of a user device displaying the user interface 509 to input a new message to be sent to the communication session. The user interface 509 may also include a graphical user interface button configured to configure settings for the user interface 509 or the communication session in general.

As the messages are sent by the user, the messages may be processed as described herein. In some embodiments, the messages may not appear in the user interface until processing has occurred. In some embodiments, messages may appear in real-time before being processed and may be replaced in the user interface with a processed message. As illustrated by FIGS. 5A and 5D, a plurality of messages sent by a user may be replaced with a single processed message.

Figure 5I:
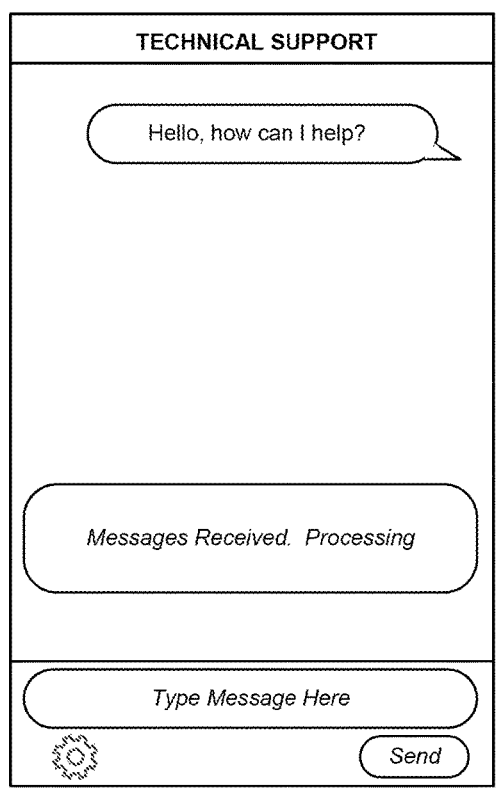
FIG. 5I is an illustration of a user interface in accordance with one or more embodiments of the present disclosure.

As illustrated in FIG. 5I, a user interface 524 displayed on a display of an administrator's device may display a notification indicating that one or more messages have been received from the other user participating in the communication session and that processing of the messages is occurring. Such a notification may be used to alert the administrator that a processed message will soon be displayed.

In some embodiments, an administrator may see only processed messages rather than each individual message used to create a processed message. In this way, the administrator may be alerted only after the processed message is shown on display. When a customer or other user has typed messages which in combination form one sentence, the system may detect a complete sentence has been formed. As the system is processing the messages to form a processed message, the technical administrator, or other user, may see an alert or other type of notification indicating messages have been received and that processing is taking place. Using such a system, an advisor will avoid being distracted until processing is complete and processed message appears.

Figure 5J:
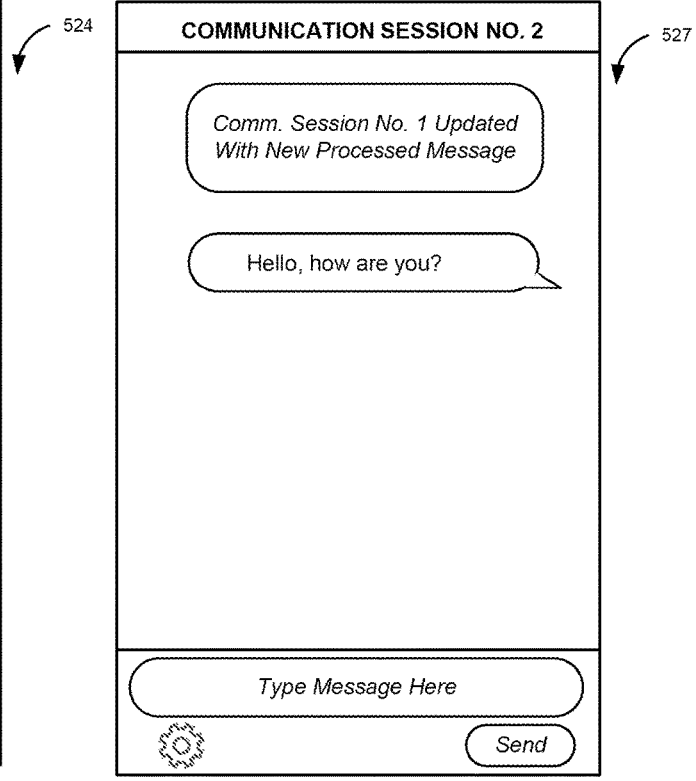
FIG. 5J is an illustration of a user interface in accordance with one or more embodiments of the present disclosure.

As illustrated in FIG. 5J, if an administrator—or other user of a system as described herein—is participating in a second communication session and has received a processed message in a first communication session, an alert or other type of notification may be displayed showing the administrator that the first communication session has been updated. In some embodiments, the alert or other type of notification may include the text of the processed message.

Figure 6:
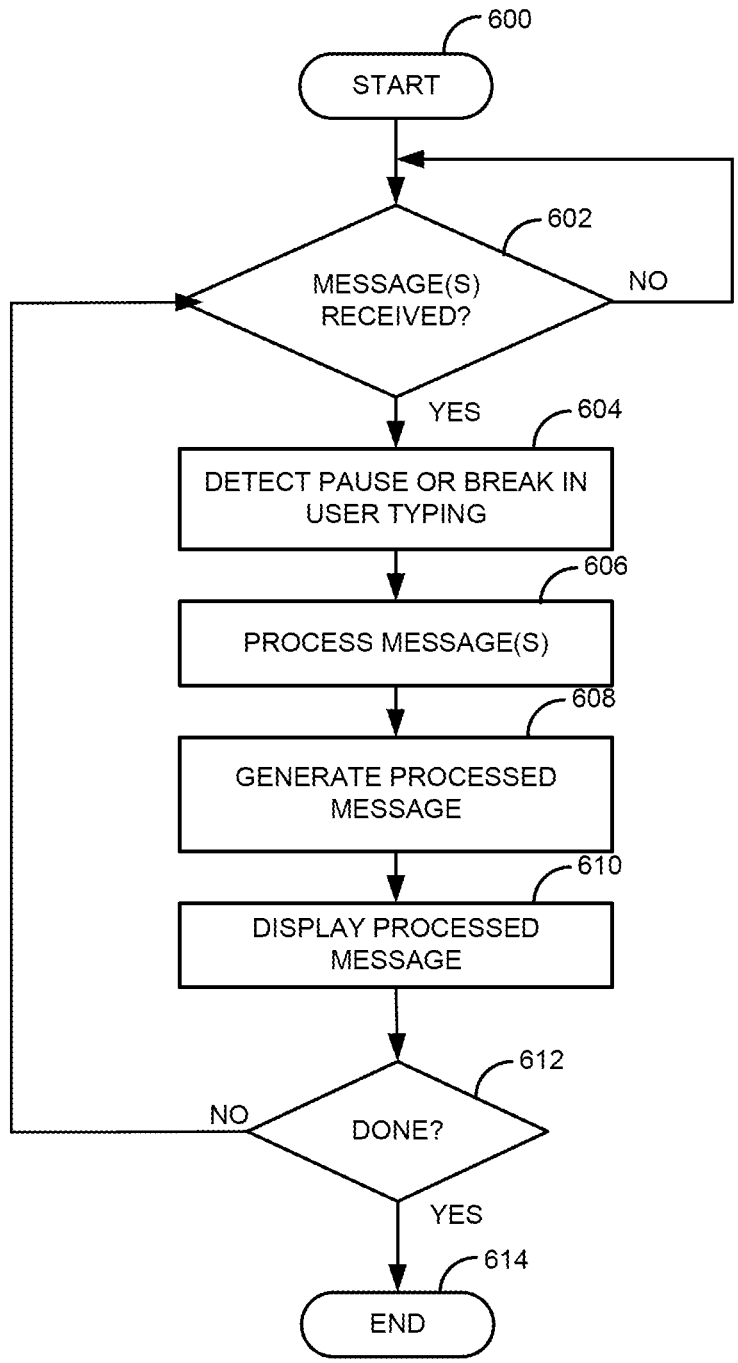
FIG. 6 is a flow diagram of a process in accordance with one or more embodiments of the present disclosure.

As illustrated in FIG. 6, a process of executing a communication session may be performed by a processor of a user device. The process of FIG. 6 may begin at step 600 in which a communication session between two or more user devices has been established. The communication session may be, for example, a text message using a text communication application such as iMessage, WhatsApp, etc., or a browser-based communication session such as via an Internet forum, a text messaging application, or a webchat from a technical support website. At step 602, a processor of a user device may wait for a message to be received.

Text messaging applications, such as browser-based web applications configured to implement a communication session, allow for immediate entry and transmittal of data. A user may simply type one or more characters and hit "Enter" or click send. The simplicity of sending messages through such an application, while providing the benefit of convenience and high-speed sharing of data, often results in the sending of incomplete messages or unedited messages riddled with typographical errors. Also, many users expect an "Enter" button to begin a new line while the "Enter" button is typically used to send messages. As a result, sentences are often cut in half and spread across multiple messages.

As an example, a typical stream of messages a contact center representative may receive from a customer may comprise the following messages:
User: I had bought a tv set
User: However some problems
User: With power
User: Not able to turn on tv
User: Tried several
User: Things
User: Check power
User: Socket.
User: No issues
User: With power socket/plug
User: Other devices are working The customer, or user, may send such messages as a result of hitting "Enter" or a send button too many times. The first character of each new message may be automatically capitalized, resulting in more confusion.

Such a multitude of messages likely results in a distraction for the employee of the contact center receiving the messages. The contact center representative may be constantly alerted to the reception of new messages despite any complete thought or sentence having been formed by the customer. Contact center representatives or others receiving such messages may counter by requesting additional information. While one user requests more information, the other user may be in the process of inputting the needed information. As a result, the nonstop flow of information between users inevitably results in confusion. Similarly, the user receiving such messages may become frustrated due to the many lines being used to form one sentence. Using conventional systems, a contact center representative will be alerted upon receipt of each incomplete message as the message is received, thereby inefficiently diverting the attention of the representative if the representative is parallely working on another communication session with another customer. Also, in the case of the user interacting with an automated system such as a bot, the bot may be unable or slow to interpret the messages.

What is needed is a system in which all information sent from the user to be included in a user-friendly manner in an ideal number of messages. Such a system may provide time-efficiencies and user-friendliness for all users and/or automated systems involved in a communication session.

In some embodiments, certain steps of the process of FIG. 6 may be performed by a processor of a user device used by the user sending the messages. In some embodiments, certain steps of the process of FIG. 6 may be performed by a processor of a user device used by a user receiving the messages. In some embodiments, certain steps of the process of FIG. 6 may be performed by a server hosting or otherwise involved in the communication session. It should be appreciated that steps described herein may be performed simultaneously or in parallel by multiple entities.

After a user of a user device types a message and sends the message using the user interface, the message may be sent to an analysis subsystem or application. The analysis subsystem may be a web based application or may be an application executed by the user device of the user sending the message, a server, or a user device of another user.

In some embodiments, a text message receive and transmit subsystem may be used to receive messages. The text message receive and transmit subsystem may be configured to transmit messages to the analysis subsystem.

At step 604, once one or more messages have been received, the processor may detect a pause or a break in the user of the user device typing. Detecting a pause or break in the user of the user device typing may comprise simply waiting a predetermined period of time for a new message to be received. In some embodiments on the other hand, detecting the pause or break in typing may comprise actively monitoring the input of text into a text box on a user interface of the user's user device.

As messages are received, the analysis subsystem may be configured to check whether the user is still typing. In some embodiments, the analysis subsystem may be configured to determine whether the user is still typing and, if so, wait for a period of time before beginning to process any received and unprocessed messages.

In some embodiments, the period of time to wait before processing messages may be a preconfigured amount of time. A user, such as a contact center administrator, may be capable of setting a maximum hard limit, such as ninety seconds. In such a case, the analysis subsystem may be configured to wait no longer than the maximum hard limit before beginning to process the received messages. In some embodiments, a user may be capable of setting a soft limit, such as sixty seconds. In such a case, the analysis subsystem may be configured to, after the soft limit time has elapsed, determine if the user is still typing or if more information is needed and, if so, send a query to the user to request additional information.

At step 606, the processor may process the received one or more messages. In some embodiments, the processor may wait until the pause or break in typing has been detected to begin the processing of the received messages. In some embodiments, the processor may actively process each message when received. Processing received messages may be performed by an analysis subsystem.

Processing received messages may comprise using natural language processing ("NLP"). NLP may be used to detect whether a complete sentence has been received in the form of one or more messages. In some embodiments, using NLP, a confidence score may be generated. The confidence score may be a percentage of likelihood that a complete sentence has been formed by the one or more messages. In some embodiments, syntactic analysis or Part of Speech (POS) tagging may be used to determine whether a sentence is accurate.

At step 608, after the processor determines the user has ceased to send messages or cease to type, the processor may generate a processed message based on the received one or more messages. In some embodiments, generating a processed message may comprise simply combining each of the received messages using a delimiter. For example, the following messages:

User: I had bought a tv set
User: However some problems
User: With power
User: Not able to turn on tv
User: Tried several
User: Things
User: Check power
User: Socket.
User: No issues
User: With power socket/plug
User: Other devices are working may be combined using a comma as a delimiter as follows:

User: I had bought a tv set, However some problems, With power, Not able to turn on tv, Tried several, Things, Check power, Socket., No issues, With power socket/plug, Other devices are working In some embodiments, delimiters may be employed in an intuitive and automated way such that messages ending in a character such as a period or comma may not be appended with a new delimiter. Other modifications to the processed message may include adding a period instead of a comma after the last text of the message and removing capital letters from beginnings of each message other than the first message. For example, the above messages may be processed and the following processed message may be generated:

User: I had bought a tv set, however some problems, with power, not able to turn on tv, tried several, things, check power, socket. No issues, with power socket/plug, other devices are working.

In some embodiments, NLP may be used to generate a processed message. For example, if NLP is being used, the analysis subsystem may utilize NLP to determine whether received messages include one or more full sentences. Natural language generation ("NLG") may be used to aggregate messages. Using NLG may comprise adding conjunction words such as "and," "or," and "but" to messages.

Using NLP/NLG to process messages and generate a processed message may comprise forming a plurality of sentences which combined form the processed message. The processed message may be transmitted to the user devices participating in the communication session.

At step 610, the processor may display the processed message in the user interface. The processed message may appear in the user interface as if the user had typed out the processed message and hit send. In case any of the users does not have the chat session open at the time the processed message may be transmitted to user device. In some embodiments, if a user is participating in another chat session, the user may be alerted when a processed message is received, for example by an alert sound or a displaying of an alert indicating a new message was received with an identifier of the chat session.

At step 612, the processor may determine whether to end the process or continue. If the process is to continue, the process may comprise returning to step 602, discussed above, and wait for one or more new messages to be received. If the process is to end, the process may comprise ending at step 614.

As should be appreciated by the above process, no matter the format of messages sent from a user during a communication session, a coherent flow of sentences may be formed and displayed in the user interface of the communication session. The above may be considered as only a summary of the possibilities of the systems and methods described herein.

In the modern world, many people spend a great deal of time communicating through social media. Textual communication is used for an ever-increasing number of situations by users at the user's workplace as well as in the user's personal life. The percentage of people using text channels to connect to customer service systems and contact centers as opposed to voice communication is also increasing.

While there are several advantages of text-based communication, there are also several challenges. One challenge is the difference between the way people speak and the way people type. Users often, when sending text over text channels, send one question or statement broken into several messages. For example, a customer contacts a contact center, and sends below messages:

Msg: I had bought a tv set
Msg: However some problems
Msg: With power
Msg: Not able to turn on tv
Msg: Tried several
Msg: Things
Msg: Checked power
Msg: Socket.
Msg: No issues
Msg: With power socket/plug
Msg: Other devices are working There are several issues with the above series of messages. The sending of many messages to make a single statement distracts the receiver of the messages multiple times. Even if the receiver asks several questions, time is wasted and not efficiently used. It would save time for the receiver of the messages if all the information were in one message.

Even for automated bots, the multitude of messages cause issues, since the bot will try to interpret the user's messages several times.

Conventional solutions to this problem are inadequate. When a receiver encounters such broken messages, he or she may ask questions to get more information; however, the user may be preparing to send the information requested by the receiver.

As described herein, an application or subsystem may be used to check, before delivering messages, if the sentence is complete, and if the user is still typing. If the sentence is incomplete and/or the sender is still typing, it can hold on the delivery, for example, until the next message arrives or until the user has stopped typing for a configured amount of time. In some embodiments, for example in a contact center context, the subsystem may detect incomplete messages that do not form a meaningful sentence and may notify the user to send a complete information before delivering the messages to the contact center agent device.

To implement the systems and methods described herein, a number of configurable options may be used. Also, systems and methods may be capable of detecting the typing of message by one or more users participating in a communication session.

In some embodiments, NLP may be used to detect whether a sentence is complete. Received messages may be input into an NLP subsystem which may output an indicator as to whether the received messages include at least one complete sentence.

In some embodiments, methods and systems comprise the utilization of a text message transmitter/receiver subsystem and a sentence checker subsystem. When a message is received from a user, before forwarding it to other users participating in the communication session, the text message receiver/transceiver subsystem may first send the message to the sentence checker subsystem.

Each message may comprise a session or transaction identifier ("id"). The transaction id may be used while interacting with the sentence checker subsystem. In this way, the sentence checker aware of a state of the communication session.

When a message from a user arrives, the message checker subsystem may perform a number of actions. For example, the message checker subsystem may be configured to check if a user is still typing. With conventional systems, messages are sent and received by the other party even when the sending user is still typing. Using systems and methods described herein, if a user is still typing, the sentence checker subsystem may be configured to wait until the typing ceases to process and send the messages. The user's state, whether typing or not, can be provided by the user's chat client to the server system which the subsystem may use to determine whether to wait for message to arrive or proceed further to process the message.

In some embodiments, the sentence checker subsystem may wait a preconfigured amount of time to ensure the user is not still typing. The amount of time may be calculated or determined depending on a detected complexity of the sentence or text of the message. In some embodiments, a maximum hard limit can be set, for example, sixty seconds. A soft limit can also be set, after the expiry of which a query can sent to the customer asking for more details.

The sentence checker may also be configured to check, using NLP, if a message contains one or more complete sentences. The sentence checker may be configured to generate a confidence score associated with whether a message comprises a complete sentence.

In some embodiments, only NLP syntactic analysis may be employed. Syntactic analysis may be designed to focus only on determining if a sentence is accurate.

When the sentence checker detects that a user has stopped sending messages, the sentence checker perform a number of actions. In some embodiments, each of the received messages may be combined using a configurable delimiter between each messages. In some embodiments, if NLP determines, with a confidence score above a certain threshold, that some, or all of the consecutive messages together form one complete sentence, the sentence checker may merge the multiple consecutive messages to form one or more sentences.

The merging of messages may be performed using NLG. Simple aggregation may be used to join messages using conjunction words such as "and," "or," and "but." Using aggregation, one or more processed sentences may be formed. The one or more processed sentences may be sent, using a text message transceiver subsystem to the communication session to be displayed on each user device participating.

In some embodiments, if the NLP results in a relatively low confidence score as to whether a complete sentence is formed, the system may resort to simple aggregation using delimiters to separate messages.

In some embodiments, the sentence checker may be configured to determine an insufficient amount of data has been received to form a complete sentence. The sentence checker may be configured to wait a particular amount to determine if the requisite amount of information to form at least one sentence has been received. If, after a particular amount of time, the user has not sent enough data to form a complete sentence, the sentence checker may be configured to instruct the text message transceiver subsystem to send a message to the user asking for more data.

In some embodiments, users may be capable of selecting from a number of configuration options. Configuration options may be set by an administrator managing the text communication application or may be set on a local level by each user participating in a communication session.

In some embodiments, configuration options may include an option as to whether a sentence checker should use NLP. As described herein, NLP technique may be limited to syntactic analysis. If NLP is disabled, configuration options may include an option as to which delimiter to use to join sentences if NLP is disabled. For example, a user may be capable of selected between a comma, semicolon, new line, space, etc.

In some embodiments, configuration options may include an option of a maximum amount of time to wait for a next message. For example, after a message is received, a clock may begin to count. After the maximum amount of time elapses, any received messages may be delivered. In some embodiments, the clock may begin to count after a detection of a user ceasing to enter text.

In some embodiments, configuration options may include an option of whether to display an alert as to whether the other user is still typing. Similarly, configuration options may include an option of whether to display an alert as to whether additional information is expected.

In some embodiments, configuration options may include one or more options relating to turning on and off any processing of messages, whether spelling errors should be automatically resolved, whether the original, unprocessed, messages should be stored in memory or deleted, whether grammar mistakes should be resolved, whether processing should be performed in real-time as users type or only after messages are sent, whether messages should be translated to other languages, whether a confidence score should be used to determine whether a processed message should be delivered or whether the original messages should be delivered, or any other options as should be understood by one of skill in the art.

Figure 7A:
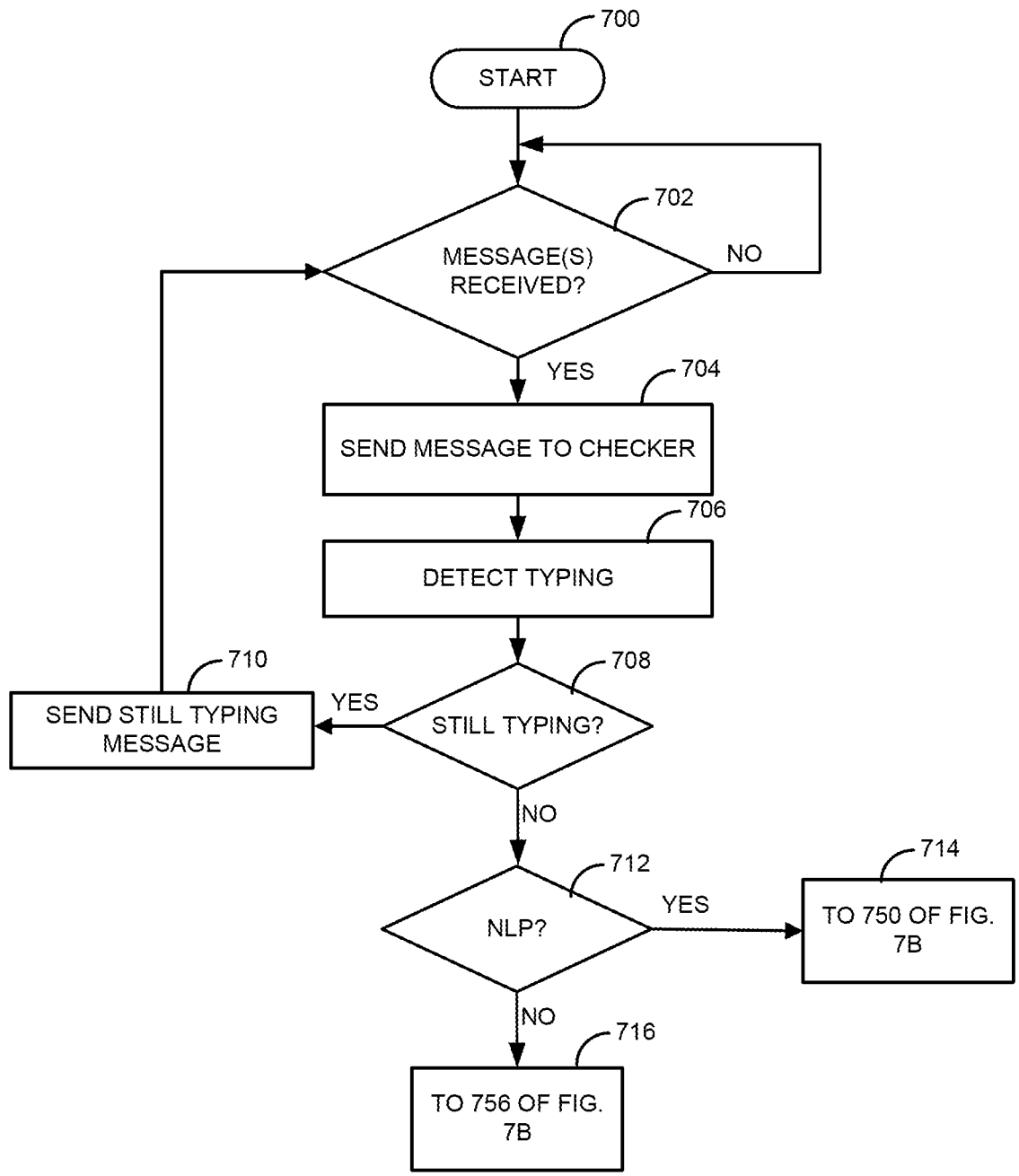
FIGS. 7A and 7B are flow diagrams of a process in accordance with one or more embodiments of the present disclosure.
Figure 7B:
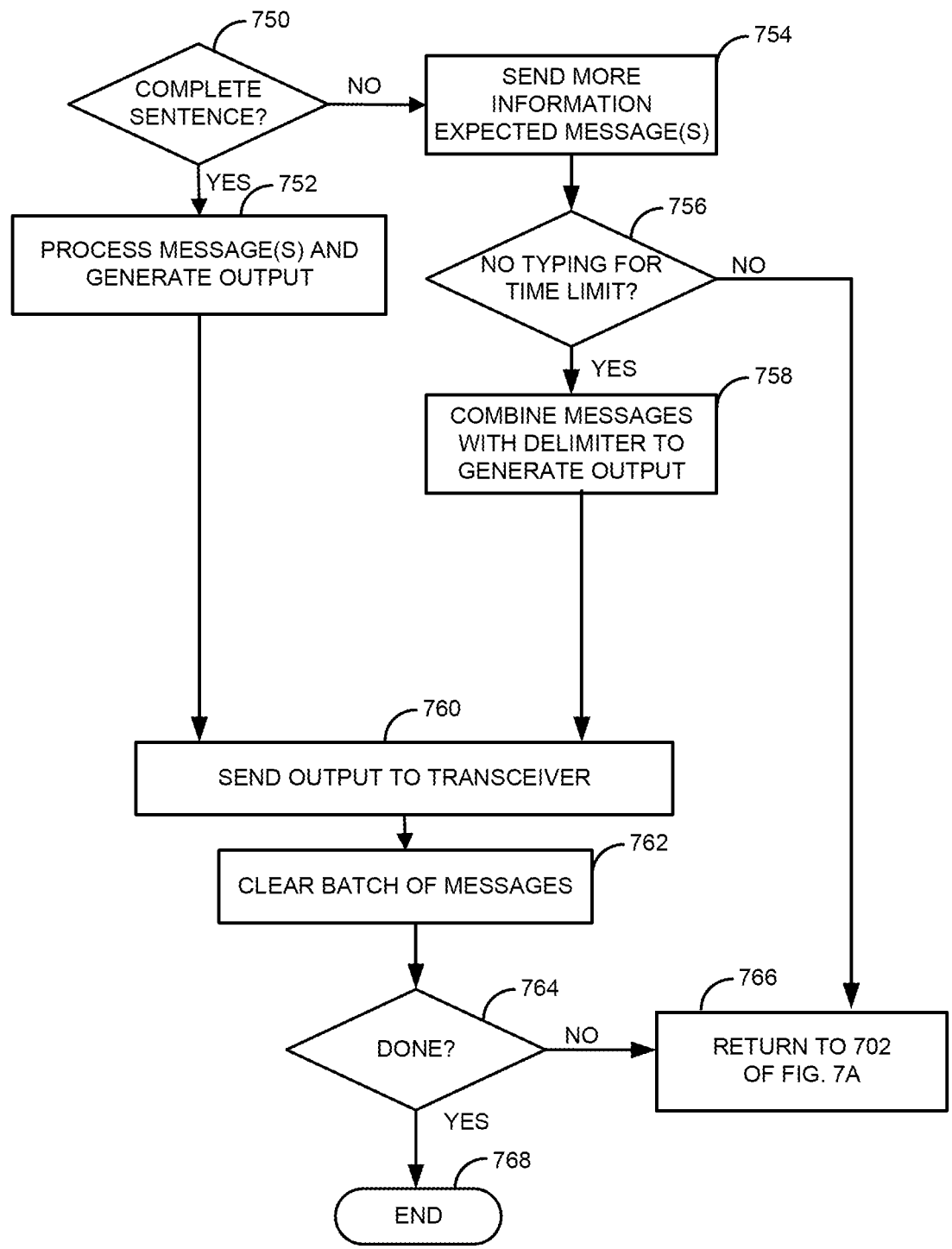

An exemplary process utilizing the systems and methods described herein is illustrated in FIGS. 7A and 7B. The process may begin with step 700 of FIG. 7A, in which a communication session is taking place between two users. As described herein, the communication may be in the form of a social media chat function, text message application, or a browser-based form of communication such as Web chat. At 702, the process comprises waiting for a message to be received from a first user device operated by a first user. Once a message is received, the message may be sent, at 704, to a checker application or system. Note that one or more steps of the process may be executed by an application executing on the first user device, a server, or a second user device. For example, a processor of a user device or a server may execute the steps described herein. The message may be received by a transceiver application or system. The transceiver application or system may transfer the received message to a checker application along with a session ID identifying the communication session. The session ID may be stored as metadata in a packet containing the text of the message.

As an example, the process may be used by a contact center to manage a communication session between a customer contacting the contact center and an agent working for the contact center. A first message from the agent may read "Hello, can I help you?". The first message from the agent may be sent with a session ID to a sentence checker, as described below, determined to be a complete sentence, as described below, processed using NLP and/or NLG, as described below, and output to the communication session for display to both the customer and the agent.

The customer may respond to the agent with a series of messages. A first message from the customer may read "I had bought a tv set".

At 706, the process may comprise detecting whether the first user is typing. Detecting typing may comprise determining whether any characters have been entered into a text box in the application used for the communication session. In this way, the processor executing the process may be capable of and configured to detect the entry of text in a text box in real time.

At 708, if the processor executing the process determines the first user is still typing, the processor may cause a notification to be presented on a second user device indicating the first user is still typing at 710. To continue the above example, the customer may still be typing an additional message. A notification may be presented to the agent so that the agent knows to wait for more information. In some embodiments, an icon may appear next to a chat session identifier in a user's display, e.g., in a righthand top corner of a chat session. The icon may visually represent that the other user is still typing, and the user can continue working on a different chat session. Such a notification may be as illustrated in FIG. 5H. In some embodiments, determining whether the first user is still typing may comprise determining whether a predetermined amount of time has elapsed since the first user has entered a character. Such an amount of time may be, for example, ten seconds. After sending a still typing message, the process may comprise returning to 702 to wait for an additional message to be received. In this way, a batch of messages may be received from a first user prior to processing the first message received. The messages of the batch of messages may be processed together as a batch or each may be processed in real-time in the order received.

Continuing the above example, the customer may send the following messages:

However some problems
With power
Not able to turn on tv
Tried several

If the processor executing the process determines the first user is not still typing for a particular amount of time, the process may comprise determining, at 712, whether NLP is to be used. The determination of whether NLP is to be used or not may be based on configuration settings as described herein. Configuration settings may in some embodiments be adjustable by any user participating in the communication session or may be adjustable by a particular user or administrator.

If NLP is to be used, the process may continue (714) with step 750 illustrated in FIG. 7B. If NLP is not to be used, the process may continue (716) with step 756 illustrated in FIG. 7B.

At 750, using NLP to perform syntactical analysis on the received messages to determine whether the text of the received messages forms one or more complete sentences. If the text of the received messages fails to form at least one complete sentence, the process may comprise sending a notification to the first user that more information is required and a notification to other users participating in the communication session that more information is expected at 754.

Continuing the above example, if NLP is being used, it may be determined that the messages in the batch received from the first user do not form at least one complete sentence. The first user may be notified, for example as illustrated in FIG. 5E and the second user may be notified as illustrated in FIG. 5F.

After sending the more information expected messages at 754, the process may continue to 756, discussed below.

If the text of the received messages forms one or more complete sentences at 750, the process may comprise processing the batch of received messages to generate an output message comprising the text of the received messages after processing with NLP and/or NLG to adjust for grammatical, typographical, or other issues at 752.

At 756, the process may comprise waiting a period of time for the first user to begin typing. If the first user does not type within a particular amount of time—which may be adjusted using configuration settings—the process may involve resorting to a simple message aggregation method by combining the messages in the batch of messages using delimiters—which may be adjusted using configuration settings—to generate an output message at 758. In some embodiments, other basic modifications may be made, such as removing internal capitalization and adding a period at the end of the final message of the batch.

Continuing the above example, if no NLP is used, the messages sent from the customer may be generated into an output message using commas as a delimiter such as "I had bought a tv set, however some problems, with power, not able to turn on tv, tried several."

If more typing is detected within the time limit at 756, the process may comprise returning to 702 of FIG. 7A described above. Continuing the above example, if NLP is being used, after first user receives the notification that more information is required, the first user may send the following messages:

Things
Checked power
Socket.
No issues
With power socket/plug
Other devices are working After the above messages are received by the checker system, the processor may determine, using NLP that one or more complete sentences have been formed and may process the messages, using NLG for example, to form a new sentence, such as:

I had bought a tv set; however, there are some issues with power. I am not able to turn on the TV. I have tried several things such as checking the power socket. But there are no issues with the power socket or plug and other devices are working well.

It should be appreciated that if the batch of messages include one or more complete sentences, but do not end with a complete sentence, a processed message may be generated using the text forming the complete sentences while the later messages which do not contribute to the complete sentences may be considered as a start of a new batch and the first user may be prompted to continue adding information to complete a next sentence.

At 760, the messages as generated using NLP/NLG in 752 or the simple aggregation method at 758 may be sent as an output of the message checker application to the transceiver to be delivered for display in the communication session.

After delivering the messages as processed or combined, the process may comprise clearing the batch of messages in the message checker at 762 so that additional messages may be received to be processed and delivered in future messages without repeating any text from previous messages. At 764, the process may comprise determining whether to continue. In some embodiments, the process may continue until the communication session ends. If the process is to continue, the process may comprise (766) returning to 702 of FIG. 7A. If the process is to end, the process may end at 768.

Embodiments of the present disclosure include a method comprising: receiving, with a processor, two or more messages from a first user device participating in a communication session; processing, with the processor, the two or more messages; generating, with the processor, a processed message; and displaying, with the processor, the processed message on a second user device participating in the communication session.

Aspects of the above method include the method further comprising, prior to processing the two or more messages, determining the two or more messages form a complete sentence.

Aspects of the above method include the method further comprising, prior to processing the two or more messages, determining no text is being entered in the first user device.

Aspects of the above method include the method further comprising, prior to processing the two or more messages, determining no text has been entered in the first user device for a predetermined amount of time.

Aspects of the above method include wherein processing the two or more messages comprises using natural language processing.

Aspects of the above method include wherein generating the processed message comprises concatenating the two or more messages using a delimiter.

Aspects of the above method include wherein the delimiter is one or more of a comma, a semicolon, and a conjunction word.

Aspects of the above method include the method further comprising storing the two or more messages and the processed message in memory.

Aspects of the above method include the method further comprising determining a confidence score associated with an accuracy of the processed message.

Aspects of the above method include the method further comprising, prior to displaying the processed message, determining the confidence score exceeds a threshold score.

Aspects of the above method include the method further comprising, prior to generating the processed message: determining an inadequate amount of information has been received to generate the processed message; and sending a request for additional information to the first user device.

Aspects of the above method include the method further comprising, prior to generating the processed message, displaying a notification on the second user device indicating text is being input at the first user device.

Aspects of the above method include wherein the processed message comprises a single sentence.

Embodiments include a first user device comprising: a processor; and a computer-readable storage medium storing computer-readable instructions which, when executed by the processor, cause the processor to execute a method, the method comprising: receiving, with the processor, two or more messages from a second user device participating in a communication session; processing, with the processor, the two or more messages; generating, with the processor, a processed message; and displaying, with the processor, the processed message.

Aspects of the above first user device include the method further comprising, prior to processing the two or more messages, determining the two or more messages form a complete sentence.

Aspects of the above first user device include the method further comprising, prior to processing the two or more messages, determining no text is being entered in the second user device.

Aspects of the above first user device include the method further comprising, prior to processing the two or more messages, determining no text has been entered in the second user device for a predetermined amount of time.

Aspects of the above first user device include wherein processing the two or more messages comprises using natural language processing.

Aspects of the above first user device include wherein generating the processed message comprises concatenating the two or more messages using a delimiter.

Aspects of the above first user device include wherein the delimiter is one or more of a comma, a semicolon, and a conjunction word.

Aspects of the above first user device include the method further comprising storing the two or more messages and the processed message in memory.

Aspects of the above first user device include the method further comprising determining a confidence score associated with an accuracy of the processed message.

Aspects of the above first user device include the method further comprising, prior to displaying the processed message, determining the confidence score exceeds a threshold score.

Aspects of the above first user device include the method further comprising, prior to generating the processed message: determining an inadequate amount of information has been received to generate the processed message; and sending a request for additional information to the second user device.

Aspects of the above first user device include the method further comprising, prior to generating the processed message, displaying a notification on the first user device indicating text is being input at the second user device.

Aspects of the above first user device include wherein the processed message comprises a single sentence.

Embodiments include a computer program product comprising: a non-transitory computer-readable storage medium having computer-readable program code embodied therewith, the computer-readable program code configured, when executed by a processor of a first user device, to execute a method, the method comprising: receiving, with the processor, two or more messages from a second user device participating in a communication session; processing, with the processor, the two or more messages; generating, with the processor, a processed message; and displaying, with the processor, the processed message.

Aspects of the above computer program product include the method further comprising, prior to processing the two or more messages, determining the two or more messages form a complete sentence.

Aspects of the above computer program product include the method further comprising, prior to processing the two or more messages, determining no text is being entered in the second user device.

Aspects of the above computer program product include the method further comprising, prior to processing the two or more messages, determining no text has been entered in the second user device for a predetermined amount of time.

Aspects of the above computer program product include wherein processing the two or more messages comprises using natural language processing.

Aspects of the above computer program product include wherein generating the processed message comprises concatenating the two or more messages using a delimiter.

Aspects of the above computer program product include wherein the delimiter is one or more of a comma, a semicolon, and a conjunction word.

Aspects of the above computer program product include the method further comprising storing the two or more messages and the processed message in memory.

Aspects of the above computer program product include the method further comprising determining a confidence score associated with an accuracy of the processed message.

Aspects of the above computer program product include the method further comprising, prior to displaying the processed message, determining the confidence score exceeds a threshold score.

Aspects of the above computer program product include the method further comprising, prior to generating the processed message: determining an inadequate amount of information has been received to generate the processed message; and sending a request for additional information to the second user device.

Aspects of the above computer program product include the method further comprising, prior to generating the processed message, displaying a notification on the first user device indicating text is being input at the second user device.

Aspects of the above computer program product include wherein the processed message comprises a single sentence.

Examples of the processors as described herein may include, but are not limited to, at least one of Qualcomm® Snapdragon® 800, 810, 820, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel®

Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Rockchip RK3399 processor, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method comprising:
   receiving, with a processor, two or more messages from a first user device associated with a communication session;
   determining that an amount of information comprised by the two or more messages is below a threshold;
   in response to determining that the amount of information received is below the threshold, sending a second request for additional information to the first user device;
   receiving a new message from the first user device;
   concatenating, with the processor, the two or more messages and the new message using one or more delimiters to form a processed message; and
   causing, with the processor, the processed message comprising the two or more messages and the new message to be displayed on a second user device associated with the communication session.

2. The method of claim 1, further comprising, prior to concatenating the two or more messages and the new message, determining the two or more messages and the new message together form a complete sentence.

3. The method of claim 1, further comprising, in response to receiving the two or more messages from the first user device and prior to concatenating the two or more messages and the new message, determining no text is being entered in the first user device.

4. The method of claim 1, further comprising, in response to receiving the two or more messages from the first user device and prior to concatenating the two or more messages and the new message, determining no text has been entered in the first user device for a predetermined amount of time.

5. The method of claim 1, further comprising determining the two or more messages and the new message together form a complete sentence, wherein determining the two or more messages and the new message together form a complete sentence comprises using natural language processing.

6. The method of claim 1, wherein one or more of the delimiters is a conjunction word.

7. The method of claim 1, further comprising storing the two or more messages and the processed message comprising the two or more messages and the new message in memory.

8. The method of claim 1, further comprising determining a confidence score associated with an accuracy of the processed message.

9. The method of claim 8, further comprising, prior to causing the processed message to be displayed, determining the confidence score exceeds the threshold.

10. The method of claim 1, further comprising, prior to receiving the new message, displaying a notification on the second user device indicating text is being input at the first user device.

11. The method of claim 1, wherein the first user device is operated by a customer of a contact center and the second user device is operated by an agent of the contact center.

12. The method of claim 1, wherein the first user device is operated by a user of a social media website and the second user device is operated by a second user of the social media website and the communication session is hosted by the social media website.

13. The method of claim 1, wherein the processed message comprising the two or more messages and the new message comprises a single sentence.

14. The method of claim 1, further comprising generating an alert indicating the processed message is delivered to the second user device.

15. A computer system comprising:
   a processor; and
   a computer-readable storage medium storing computer-readable instructions which, when executed by the processor, cause the processor to execute a method, the method comprising:
   receiving two or more messages from a first user device associated with a communication session;
   determining that an amount of information comprised by the two or more messages is below a threshold;
   in response to determining that the amount of information received is below the threshold, sending a second request for additional information to the first user device;
   receiving a new message from the first user device;
   concatenating the two or more messages and the new message using one or more delimiters to form a processed message; and
   causing the processed message comprising of the two or more messages and the new message to be displayed on a second user device associated with the communication session.

16. The first user device of claim 15, wherein the method further comprises, prior to concatenating the two or more messages and the new message, determining the two or more messages and the new message together form a complete sentence.

17. The first user device of claim 15, wherein the method further comprises, in response to receiving the two or more messages from the first user device and prior to concatenating the two or more messages and the new message, determining no text is being entered in the second user device.

18. A computer program product comprising:
- a non-transitory computer-readable storage medium having computer-readable program code embodied therewith, the computer-readable program code configured, when executed by a processor, to execute a method, the method comprising:
  - receiving, two or more messages from a first user device associated with a communication session;
  - determining that an amount of information comprised by the two or more messages is below a threshold;
  - in response to determining that the amount of information received is below the threshold, sending a second request for additional information to the first user device;
  - receiving a new message from the first user device;
  - concatenating the two or more messages and the new message using one or more delimiters to form a processed message; and
  - causing the processed message comprising the two or more messages and the new message to be displayed on a second user device associated with the communication session.

19. The computer program product of claim 18, wherein the method further comprises, prior to concatenating the two or more messages and the new message, determining the two or more messages and the new message together form a complete sentence.

20. The computer program product of claim 18, wherein the method further comprises, in response to receiving the two or more messages from the first user device and prior to concatenating the two or more messages and the new message, determining no text is being entered in the first user device.

* * * * *

UNITED STATES PATENT AND TRADEMARK OFFICE
CERTIFICATE OF CORRECTION

| | |
|---|---|
| PATENT NO. | : 11,556,696 B2 |
| APPLICATION NO. | : 17/201852 |
| DATED | : January 17, 2023 |
| INVENTOR(S) | : Sandesh Chopdekar, Pushkar Deole and Navin Daga |

It is certified that error appears in the above-identified patent and that said Letters Patent is hereby corrected as shown below:

In the Claims

Column 25, Line 3, Claim 16 after "and the new message" delete ";" therein.

Signed and Sealed this
Twenty-first Day of March, 2023

Katherine Kelly Vidal
*Director of the United States Patent and Trademark Office*